United States Patent
Demaray

[11] 3,930,611
[45] Jan. 6, 1976

[54] AIR CONDITIONING CONTROL SYSTEM AND METHOD

[75] Inventor: Merlin E. Demaray, Columbus, Ohio

[73] Assignee: Ranco Incorporated, Columbus, Ohio

[22] Filed: July 18, 1974

[21] Appl. No.: 490,420

[52] U.S. Cl. .................. 236/1 B; 236/47; 236/91
[51] Int. Cl.² .............. G05D 23/24; F24F 11/08
[58] Field of Search .......... 236/1 B, 1 C, 91, 47, 46, 236/38; 165/12; 219/492

[56] References Cited
UNITED STATES PATENTS

| | | | |
|---|---|---|---|
| 2,196,170 | 4/1940 | Nessell | 236/91 X |
| 2,236,624 | 4/1941 | Littwin | 236/91 |
| 2,265,512 | 12/1941 | Brown et al. | 236/47 X |
| 2,719,672 | 10/1955 | Jenkins | 236/46 |
| 3,038,663 | 6/1962 | Flores | 236/38 X |

Primary Examiner—William E. Wayner
Attorney, Agent, or Firm—Watts, Hoffmann, Fisher & Heinke, Co.

[57] ABSTRACT

A multiple zone air conditioning control system is disclosed in which air temperatures in respective individual zones are governed according to signals derived from sensed air temperatures in the respective zones and sensed temperature of air discharged to the respective zones.

A zone set back unit is employed for setting back the air temperatures in all or any individual ones of the zones. The set back unit superimposes a set back signal on the temperature signals from the set back zones to effect a reduction of the air temperature in those zones as well as to prevent the sensed temperatures of air discharged to those zones from affecting the set back signal. The maintenance of air temperatures in zones which are not set back is unaffected by operation of the set back unit.

1 Claim, 4 Drawing Figures

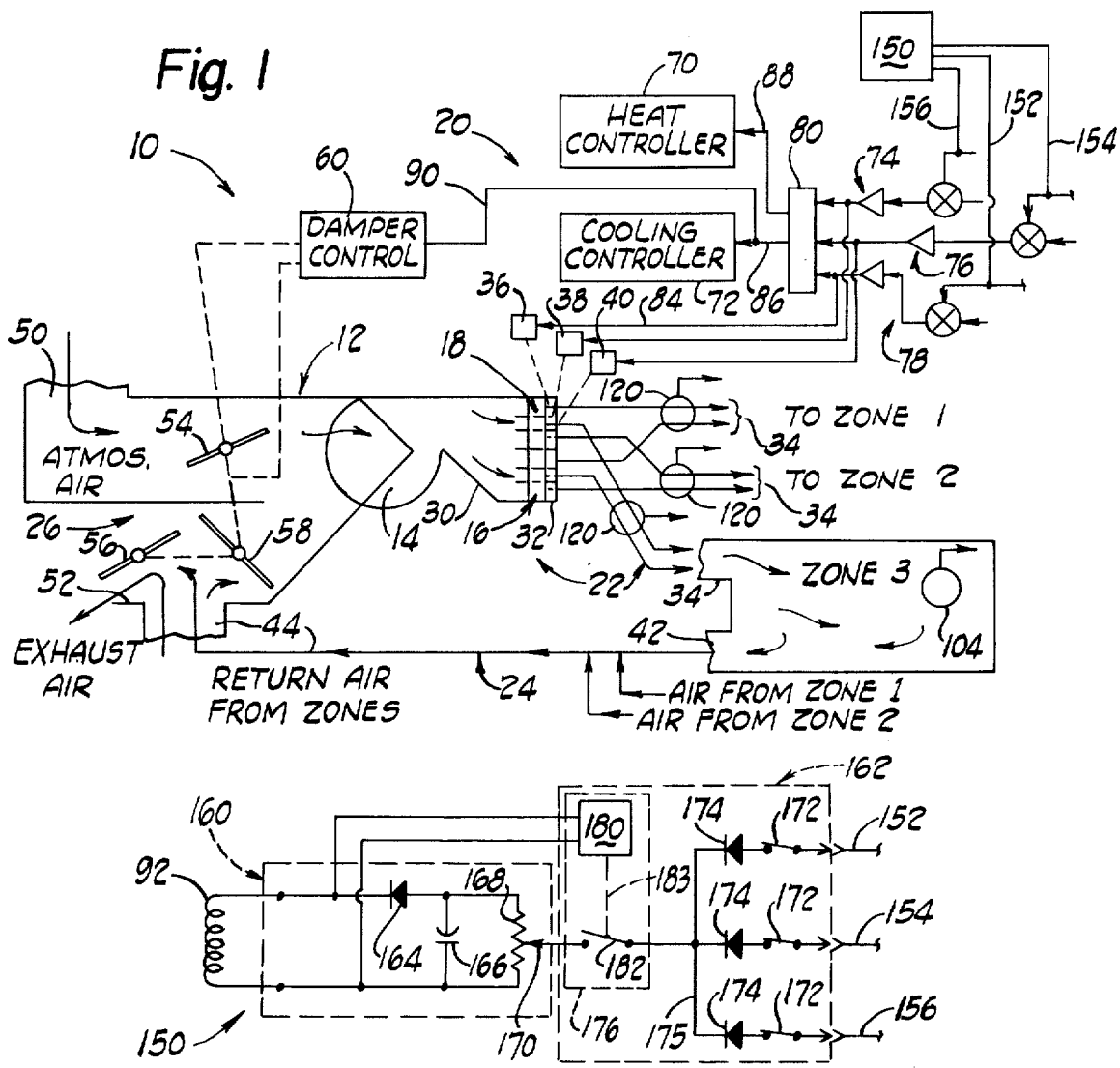
Fig. 1
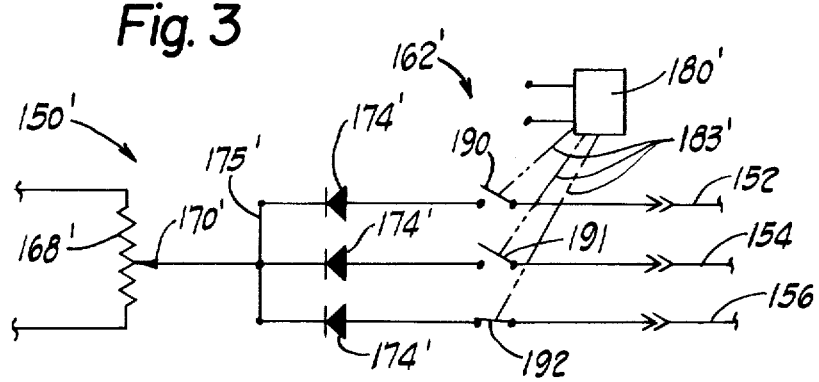
Fig. 3
Fig. 4

AIR CONDITIONING CONTROL SYSTEM AND METHOD

BACKGROUND OF THE INVENTION

1. Field of the Invention

The present invention relates to air conditioning control systems and more particularly relates to air conditioning control systems wherein zone temperatures are "set back" and maintained at a set back level during periods when the zones are unoccupied.

2. The Prior Art

Air conditioning control systems for single and multiple zone building structures have been proposed in which individually determinable zone temperatures are automatically maintained during periods of occupancy of the structure. These systems have been operated both pneumatically and electrically with the operation of heating and/or cooling equipment governed by pneumatic or electrical condition responsive signals produced by suitably constructed sensors. Pneumatic systems have generally produced pressure signals which vary in relation to sensed temperature changes while electrical systems have produced condition responsive signals having voltage, current, or frequency values which changes according to sensed temperature changes.

Control systems of the character referred to have become relatively sophisticated over the years in order to permit zone temperature conditions to be maintained as closely as possible to the desired "set point" temperatures of individual zones. One such system is disclosed by U.S. Pat. No. 3,788,386 issued 29 Jan. 1974 to Demaray. The Demaray patent discloses a sophisticated electrically operated multiple zone control system in a forced-air air conditioning system. Each of the individual zones is provided with a temperature sensor exposed to air in the zone and a temperature sensor for detecting the temperature of the air which is discharged to the zone from the heating and/or the cooling equipment in the building. Both of the sensors produce temperature responsive signals which vary according to changes in the sensed temperature of the medium to which they are exposed and the heating and/or cooling equipment of the air conditioning system is governed by a command signal which is derived from a combination of the sensor signals.

Systems of the general character described in the Demaray patent are extremely effective in maintaining closely controlled zone temperatures because the discharge sensor signals from the zone requiring the most heating, or cooling, control termination of cycling of the heating or cooling equipment, as the case may be, when the zone air temperature approaches the set point temperature. When the sensed temperature in such a zone is not close to the set point temperature, the operation of the heating or cooling equipment is initiated primarily by the signal produced by the zone air sensor.

In this type of system the discharge sensor signal has a relatively small authority compared to the authority of the signal produced by the zone air sensor so that the effect of the discharge sensor is to provide a "leading" or anticipating signal which prevents the temperature of the zone from overshooting the desired set point temperature.

In office buildings, schools and similar structures which are unoccupied during substantial periods of time during each day, it is frequently desirable to maintain the inside temperature of the buildings at levels which are beyond the "comfort" range when the structure is unoccupied. During the heating season the structures are heated by the air conditioning system and temperatures are thermostatically maintained at levels determined by the occupants during the periods of the occupancy of the building. The building temperatures are frequently automatically "set back" to lower levels when the buildings are unoccupied in order to reduce fuel or energy consumption.

In most circumstances the heating systems remain operative during the set back period so that the interior building temperatures are not reduced to excessively low levels. This is done to avoid the possibility of the inside temperature dropping below freezing and causing damage to interior pipes and equipment. Furthermore, heating up an excessively cold building to the comfort range sometimes requires a long period of time, is inefficient, and in many instances the tendency for the temperatures within the building to overshoot the comfort range is pronounced. Accordingly during temperature set back periods, the heating equipment is operated to maintain the building from 10° to 20F° below the temperature levels maintained when the structure is occupied.

Pneumatic and electrically operated control systems have been constructed to permit building temperatures to be set back during periods when the buildings are unoccupied. The operation of these systems is usually governed by a timer arrangement which initiates and terminates the temperature set-back period. An example of a pneumatically operated system which provides for set back temperatures is disclosed by U.S. Pat. No. 3,038,663 issued 12 June 1962 to Flores and which functions to control the set back temperature by changing the pneumatic control system supply pressure from that supplied to the control system during periods of occupancy to a set back pressure level. During the temperature set back period, the control system continues to operate in its normal fashion except that lower structure temperatures are maintained. In an electrical control system, this kind of operation is analogous to altering an appropriate voltage, current or frequency value of the electrical power supply for the control system.

An example of an electrical system employing a setback control is disclosed in U.S. Pat. No. 2,719,672 issued 4 Oct. 1955 to Jenkins and in which a thermally responsive bridge circuit controls operation of a furnace. A timer mechanism alters the bridge resistance to vary the zone temperatures produced between the unoccupied and occupied periods of the day.

The general principles of operation of the zone set back arrangements in the Jenkins and Flores patents, if applied to a control system of the character disclosed by the Demaray patent, would be effective to provide desired set back temperatures during periods when the buildings are unoccupied but would tend to produce some undesirable consequences.

In the first place such systems would function to maintain the zone temperatures rather precisely at the set back level by terminating operation of the heating equipment under at least partial control of the discharge sensor as the zone temperature approached the set back level. It is not necessary to maintain zones at a precise set back temperature level and cyclic fluctuations of zone temperatures are not undersirable since the zone is unoccupied anyway. Hence during set back periods, short cycling of the heating equipment is both unnecessary and inefficient.

If the electrical power supply voltage level for the control system were altered during the set back period, as suggested by the Flores patent, and a zone or part of the structure were occupied during a normal set back period, the entire structure would have to be maintained at the normal temperature level because selected setting back of individual, unoccupied zones could not be accomplished.

Altering individual thermostatic bridge resistances, as suggested by the Jenkins patent, would require a number of plural duplicate circuits in a multiple zone system and while enabling selective setting back of temperatures in certain zones, would substantially complicate the control system.

SUMMARY OF THE INVENTION

The present invention provides a method and apparatus for setting back temperatures in a single or multiple zone structure wherein, during normal periods of occupancy, the zone temperatures are closely controlled around desired set point temperature levels and during zone temperature set back periods, when the zones are unoccupied, the zone temperatures are maintained around desired set back temperature levels with minimum cycling of the zone heating equipment.

The present invention is particularly adapted for use in an air conditioning control system in which operation of zone heating equipment is governed in relation to sensed zone air temperature and the sensed temperature of a heating medium supplied to the zone. When the zone air temperature is close to the zone set point temperature operation of the heating equipment is governed to a significant extent by the sensed supply medium temperature. When the zone air temperature varies appreciably from the set point temperature, operation of the heating equipment is initiated primarily by the sensed zone air temperature.

In accordance with the invention an air conditioning control system of the character referred to is provided with a predetermined temperature set back signal which causes the control system to maintain the zone temperature at a predetermined set back temperature level while at the same time minimizing the effect of the sensed supply medium temperature on the heating equipment. The operation of the heating equipment is thus governed principally by the sensed zone air temperature at all times during the set back period. This minimizes cycling of the heating equipment during the set back period and increases the efficiency of the air conditioning system.

In accordance with another important feature of the invention, a multiple zone air conditioning control system is associated with one zone set back unit which is capable of simultaneously setting back the temperatures of all, or any selected ones, of the system zones without adversely affecting operation of the control system in maintaining desired temperature levels during normal periods of occupancy. When one or more zones are occupied during a normal temperature set back period, the remaining unoccupied zones can be set back to a predetermined level without affecting the ability of the control system to closely govern the temperatures in the occupied zone or zones in the usual manner.

Still another feature of the invention resides in the ability of a system constructed in accordance with the invention to enable each zone of a multiple zone system to be set back and heated up again after the set back period in accordance with a predetermined individual schedule.

A zone temperature set back unit constructed in accordance with the principles of the invention can be installed as part of the centralized control system and connected to individual supply medium temperature sensors which are located adjacent the air conditioning equipment for the building and remote from the individual zones. Accordingly, installation and maintenance of a set back unit constructed in accordance with the invention is easily accomplished because the unit need not be connected to any parts of the zone, or zones, being air conditioned.

A general object of the invention is the provision of a new and improved method and apparatus for setting back zone temperatures in an air conditioning system.

Other objects and advantages of the present invention will become apparent from the following detailed description of preferred embodiments made with reference to the accompanying drawings which form a part of the specification.

Brief Description of the Drawings

FIG. 1 is a schematic illustration of an air conditioning system embodying the present invention;

FIG. 3 is a schematic illustration of a temperature set back unit forming part of the system illustrated in FIG. 2; and, FIG. 4 is a schematic illustration of an alternate construction of the temperature set back unit shown in FIG. 3.

DESCRIPTION OF PREFERRED EMBODIMENTS

Figure 2:
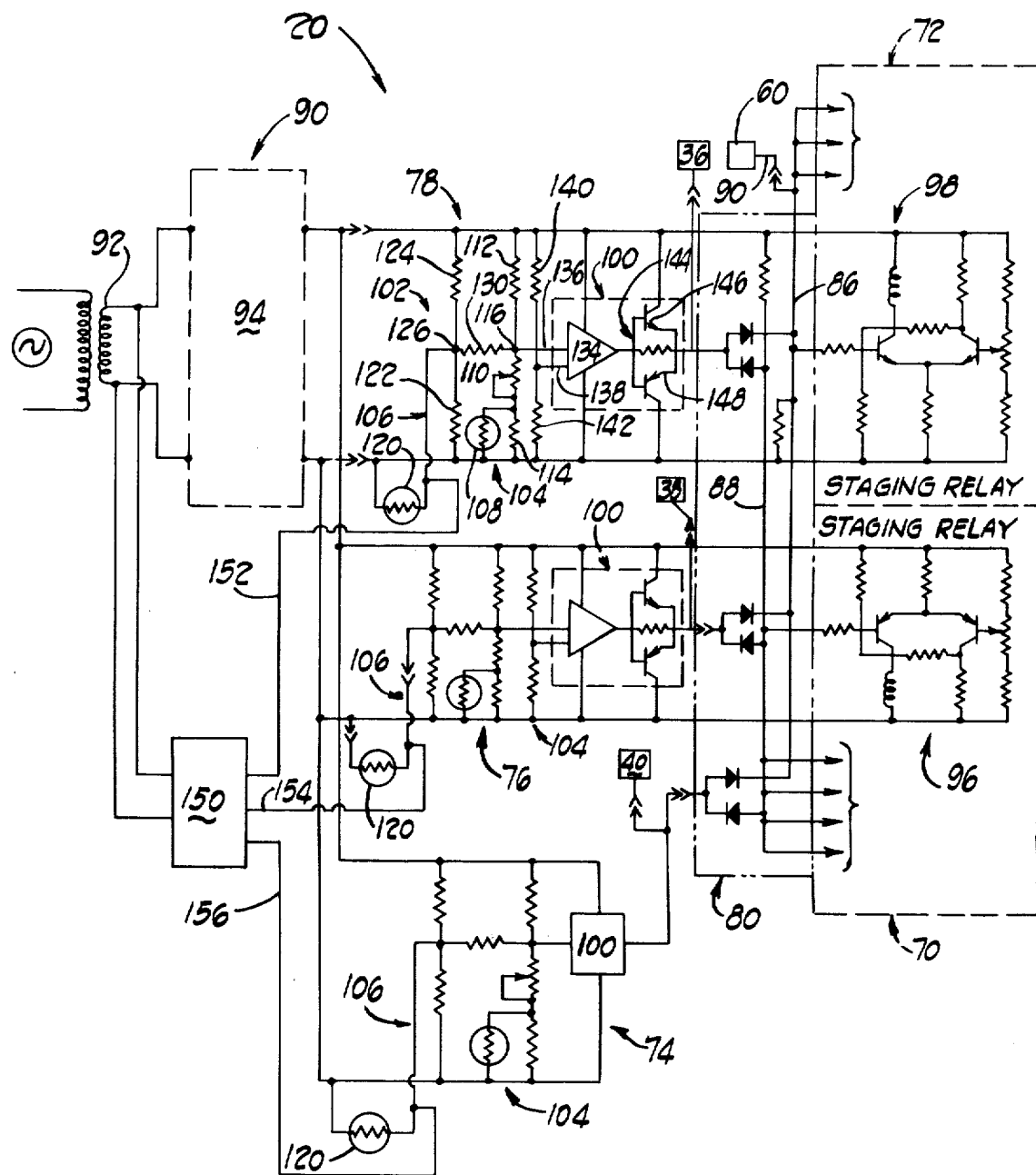
FIG. 2 is a schematic illustration of part of a temperature control system forming part of the system of FIG. 1.

An air conditioning system 10 constructed according to a preferred embodiment of the invention is schematically illustrated in FIG. 1. The system 10 provides conditioned air to three separate zones of a multiple zone building, which itself is not illustrated. The zones are referred to as zone 1, zone 2 and zone 3, and only zone 3 is illustrated schematically. The system 10 includes an air circulating duct network 12, a blower 14 for providing a forced flow of air through the duct network, an air heating unit 16 and an air cooling unit 18, both of which are disposed within the duct network so that air flowing through the network passes across either the cooling unit or the heating unit, and a control system generally indicated by the reference character 20 which governs operation of the system 10.

The system 10 is, for the most part, schematically illustrated and described generally for the sake of brevity. Many of the briefly described components of the system 10 are shown and described in greater detail in the above referenced U.S. Pat. No. 3,788,386 issued 29 Jan. 1974, to which reference should be made for additional details. Departures in the system disclosed here from that of the referenced application will be apparent from the following description.

The heating unit 16 can be of any suitable or conventional construction but for the purposes of this description the heating unit is considered to be constructed from a plurality of electrical resistance heaters which are operated in stages to govern the amount of heat produced by the heating unit.

The air in the system is preferably mechanically chilled by a plurality of compressor-condenser-evaporator refrigeration units, not shown, which are operable in stages to govern the amount of heat absorbed from the air in the system. The cooling unit 18 includes the evaporators of the refrigeration units.

The air duct network 12 comprises an air delivery duct system 22 for directing air from the blower 14 to the respective zones through the heating and cooling units 16, 18, respectively, a return air duct system 24, only partly shown, for receiving air exhausted from the zones, and a ventilation system 26 by which atmospheric air is admitted to the system 10 while a corresponding amount of air from the return air duct system 24 is exhausted from the system. The system 10 is of a type known as a constant volume system in that a constant flow rate of air continuously circulates in the system and each zone is continuously provided with an unvarying flow rate of air.

The delivery duct system 22 comprises a blower plenum section 30 in which the heating and cooling units 16, 18 are disposed so that air moving through the plenum 30 towards the zones passes across either the heating unit or the cooling unit, a zone damper section 32 at the discharge side of the heating and cooling units, and three discharge ducts 34 (schematically shown) for directing air from the damper section 32 to each associated respective zone.

The damper section 32 includes three actuable damper pairs (not shown), one pair for each zone. The damper pairs are actuated by respective zone damper control units 36, 38, 40 in accordance with temperature requirements of associates zones. The damper pairs for each zone enable complementary dampering of air flowing to that zone from the heating unit 16 and the cooling unit 18. The damper pair for each zone has one limit position in which all of the air flowing to the zone passes across the heating unit, a second limit position in which all of the air flowing to the zone passes across the cooling unit, and intermediate positions in which the flow of air to the zone consists of a mixture of air which has passed across the heating unit and the cooling unit, with the proportions of the mixture being determined by the position of the damper pair.

The return duct system 24 comprises zone exhaust branches 42 (only one of which is illustrated in connection with zone 3) communicating each zone to a main return duct 44 which directs the combined zone exhaust air flows to the ventilating system 26.

The ventilating system 26 comprises an atmospheric air intake duct 50 through which atmospheric air is introduced into the system 10, an exhaust duct 52 through which air from the return duct 44 is exhausted to atmosphere from the system, and a dampering arrangement for controlling the flow of air through the intake and exhaust ducts 50, 52.

The dampering arrangement comprises an intake air damper 54, an exhaust air damper 56 and a recirculating air damper 58. The dampers 54, 56, 58 are linked together and actuable to desired positions by a damper control unit 60 in response to operation of the control system 20.

The control system 20 governs operation of the heating and cooling units 16, 18, the zone damper control units 36, 38 and 40, and the damper control unit 60 in response to sensed conditions of air circulating in the system 10. The control system is preferably an electrical system and includes an air heating unit controller 70 for governing the heat transfer to system air from the unit 16, an air cooling unit controller 72 for governing heat transfer from the system air to the unit 18, individual condition signal producing circuits 74, 76, 78 for producing temperature related command signals for governing operation of the controllers 70, 72, and a signal analyzer unit 80 interposed between the signal producing circuits and the controllers. The command signals from the circuits 74, 76, 78 also individually control the respective associated damper control units 40, 38, 36.

In the preferred and illustrated embodiment, the command signals are D.C. analog signals, and the heating and cooling controllers are constructed to operate the respective heating and cooling units in stages in response to appropriate changes in command signal voltages which are applied to the respective controllers via the analyzer unit 80. The circuitry of the preferred control system is constructed such that as the zone air temperature rises, the magnitude of the command signal voltage increases positively with respect to a reference voltage level in proportion to the temperature rise. As the zone temperature is reduced, the command signal voltage level is likewise reduced.

The damper pair associated with zone 3 is actuated by the damper control unit 36 to positions at which the air flowing from the heating and cooling units 16, 18 is proportioned in accordance with the heating or cooling requirements of that zone as reflected by the zone 3 command signal. The command signal from the signal producing circuit 78 is transmitted to the zone damper control 36 via a suitable conductor 84. The damper control 36 responds to command signal voltage levels within a predetermined range to position the damper pair in accordance with the command signal level. When the command signal is beyond the voltage range the damper pair is in one or the other of its limit positions. The damper control units 38, 40 are likewise individually controlled by the command signals from their associated signal producing circuits 76, 74.

The signal analyzer unit 80 enables the control system 20 to satisfy the heating requirements of the coolest zones and the cooling requirements of the warmest zone while the heating or cooling requirements of the remaining intermediate zone (or zones) is satisfied by operation of the associated zone damper control unit alone. The command signal from the warmest zone has the most positive voltage level, the command signal from the coolest zone has the least positive voltage level, and the command signal from the zone of intermediate temperature has an intermediate voltage level. The unit 80 is connected to the outputs of each zone signal producing circuit and functions to transmit the command signal from the warmest zone to the cooling controller 72 via an output conductor 86 and to transmit the command signal from the coolest zone to the heating controller 70 via a conductor 88. The command signal from the remaining intermediate zone, or zones if more than three zones are present in the building, is blocked by the analyzer unit 80, but remains effective to govern the positioning of the zone damper pair for that zone.

The introduction of atmospheric air to the air conditioning system is variably controllable by the command signal from the warmest zone. For this purpose a conductor 90 interconnects the ventilating damper control unit 60 and the logic unit output conductor 86.

Generally speaking, when the warmest zone is at or below a predetermined temperature less than its set point temperature, the command signal transmitted to the damper unit 60 is such that the intake air damper 54 is positioned for minimizing the introduction of atmospheric air to the system. This position of the intake air damper 54 is often referred to as "closed," but the damper 54 normally is in a limit position in which a predetermined minimum flow of atmospheric air is continuously introduced into the system to satisfy fresh-air ventilation requirements. A like flow of system air is exhausted from the system 10 through the exhaust damper 56, and as a result of leakage from the building. When the dampers 54, 56 are closed, the recirculating air damper 58 is wide open so that a maximum flow of system air is recirculated.

As the temperature of the warmest zone increases towards its set point temperature the command signal level increases and the damper control unit 60 is operated to progressively open the dampers 54, 56 while closing the damper 58. As the warmest zone continues to become warmer, the command signal level increases accordingly until a level is reached where the dampers 54, 56 are wide open and the damper 58 is closed. In this condition the operation of the damper control unit 60 is limited so that further increases in command signal level do not change the positions of the dampers 54, 56 and 58.

In such circumstances the atmospheric air is frequently solely used to control the load on the system, particularly when the temperature in the warmest zone stabilizes below a level which would require operation of the air cooling unit. When the warmest zone temperature increases sufficiently above the set point temperature that mechanical cooling of the air delivered to that zone is required, the zone command signal causes the cooling controller 72 to initiate operation of the cooling unit 18 and the damper control unit 60 is operatad to "close" the intake damper 54 by a suitable or conventional switching arrangement, not illustrated.

A preferred embodiment of the control system 20 is schematically depicted in FIG. 2. The control system 20 comprises a power supply 90 formed by the secondary 92 of a step-down transformer and a regulated D.C. power source circuit 94 connected across the secondary 92. The circuit 94 provides a regulated source of direct current for operating the control system 20.

The heating controller 70, as seen in FIG. 2, comprises a plurality of voltage level responsive staging relay circuits 96 only one of which is illustrated. The cooling controller 72 likewise comprises a plurality of staging relay circuits 98, only one of which is illustrated. The analyzer unit 80 connects the cooling controller 72 to the command signal to the warmest zone in the system so that as the command signal voltage from the warmest zone increases (indicating increasing the zone temperature) successive staging relays 98 of the controller 72 are operated to operate successive ones of the cooling stages. As the temperature in the warmest zone decreases the command signal voltage decreases causing the stages of the cooling unit to successively cycle off. The command signal from the warmest zone is also transmitted from the analyzer unit 80 to the damper control 60 for governing the relative positions of the exhaust, recirculating air, and outside air damper units.

The analyzer unit 80 connects the heating controller 70 to the command signal from the coolest zone in the building so that as the command signal voltage level decreases, indicating a decreased zone temperature, successive stages of the heating units are operated to increase the heat supplied to the zone. As the command signal voltage level increases, indicating an increase in the zone temperature, the heating unit stages are successively cycled off.

The construction and operation of the analyzer circuitry 80, the heating controller 70, the cooling controller 72 and the damper control 60 are described in more detail in the aforementioned U.S. Pat. No. 3,788,386 to Demaray, and reference should be made to that patent, for a fuller understanding of the operation of these components of the system.

The command signal producing circuits 74, 76, 78 are all identical and therefore only the circuit 78 is described in detail in reference to FIG. 2. The circuitry 78 comprises a command signal amplifier unit 100 and condition sensing circuitry 102. The condition sensing circuitry 102 provides an input signal to the amplifier unit 100 which varies in relation to sensed zone air temperature and discharge air temperature and this input signal is amplified to produce a command signal from the circuitry 78. The conditioning sensing circuitry 102 includes a zone air temperature sensing circuit 104 and a discharge air temperature sensing circuit 106.

The circuit 104 comprises a zone sensor element 108, a zone set point adjustment element 110 and associated resistors 112, 114, all of which are connected across the output terminals of the power source circuit 94. The zone air sensing element 108 is preferably formed by a thermistor while the set point adjusting element 110 is a manually adjustable potentiometer. The elements of the circuit 104 cooperate to produce a zone air temperature responsive signal at the junction 116.

The discharge air temperature sensing circuit 106 comprises a discharge air temperature sensor element 120, and associated resistors 122, 124 which cooperate to produce a sensed discharge air temperature signal at a junction 126. The sensor 120 is preferably a thermistor which is located in the air supply duct for zone 3 just downstream from the discharge dampers (as shown in FIG. 1) remote from the zone.

The signals from the sensor circuits 104, 106 are algebraically combined at the junction 116 to produce a combined input signal to the amplifier unit 100. The junctions 126, 116 are interconnected by a resistor 130 which effectively reduces the authority of the signal from the discharge sensor circuitry 106 with respect to the signal from the zone air temperature sensing circuitry 104. The authority ratio between the circuit 106 and the circuit 104 is preferably about 20:1 which is to say that the change in the voltage level at the junction 116 resulting from the sensor 120 detecting a temperature change of 20°F is the same as the change in level of the signal at the junction 116 created by a detection of a 1°F temperature change by the sensor element 108.

The amplifier unit 100 comprises a differential amplifier 134 which is preferably formed by a suitable or conventional integrated circuit having an input lead 136 connected to the junction 116 and a reference input lead 138. The lead 138 is connected to a fixed reference level which is established by resistors 140, 142 connected across the output of the power source circuit 94. The amplifier 134 is provided with suitable external filter and feedback circuits which may be of any conventional construction and therefore are not illustrated.

In the illustrated embodiment of the invention the amplifier 134 inverts and amplifies the difference between the condition signal established at the junction 116 and the reference voltage level on the reference input lead 138. When a sensed temperature increases, the level of the output from the amplifier increases proportionately and as sensed temperature is reduced the output level from the amplifier 134 is likewise reduced.

The amplifier 134 is associated with an output stage 144 which includes emitter-follower connected transistors 146, 148 which are employed to provide a desired command signal current level to the heating or cooling controller units via the analyzer unit 80. The output from the stage 144 is also connected to the zone damper control unit 36 as is noted previously.

According to the present invention the temperature of all or selected ones of the zones can be set back to a predetermined relatively low level during periods when the zones are unoccupied. As illustrated by FIG. 1, a temperature set back unit 150 is associated with the signal producing circuits 74, 76, 78 which operates to produce the zone temperature set back over a desired interval while at the same time substantially preventing the discharge sensor 120 from any of the set back zones from exercising control over the cycle durations of the heating unit 16 throughout the set back period.

As shown in FIGS. 1 and 2 the unit 150 is connected to the discharge temperature sensing circuits 106 of the signal producing circuits by respective conductors 152, 154, 156. As illustrated in FIG. 3, the unit 150 comprises a set back signal source circuit 160 and connecting circuitry 162 for connecting and disconnecting the signal source circuit 160 from the respective ones of the signal producing circuits 74, 76, 78. It should be noted that the unit 150 can be connected to the discharge temperature sensing circuits 106 adjacent the damper section 32 so that additional wiring in the building structure to the individual zones is not required and the set back unit 150 can be installed at any desirable location around the heating and cooling equipment.

The signal source circuit 160 comprises a rectifier connected across the transformer secondary 92. The illustrated rectifier includes a diode 164 and a capacitor 166 which cooperate to provide a half wave rectified, filtered, relatively steady state D.C. voltage across the capacitor 166. A potentiometer 168 is connected across the capacitor 166 and is provided with an adjustable wiper 170 at which a desired set back signal level is provided. The set back signal level is adjustable by moving the wiper 170 along the potentiometer 168.

The connecting circuitry 162 selectively interconnects the individual zone signal producing circuits 74, 76, 78 with the set back signal source circuit 160, and includes isolator circuits each connected to a respective one of the conductors 152, 154, 156 and a timer unit connected between the isolator circuits and the circuit 160. The timer unit provides for periodic setting back of all of the zone temperatures on a predetermined schedule while the isolator circuits enable any selected zone to be maintained at its normal temperature level during the set back period if desired.

Each isolator circuit includes a normally closed manual switch 172 and an isolating diode 174 which are connected in series between a respective sensor circuit 106 via one of the conductors 152, 154 or 156 and a common conductor 175. The diodes 174 are poled so that during normal operation of the control unit the signals from the respective sensing circuits 106 do not interact with each other. The switches 172 are individually operable to isolate the respective associated sensing circuit 106 from the set back unit 150 if setting back of the temperature in the associated zone is undesired.

The timer unit, indicated by the reference character 176, is disposed between the conductor 175 and the potentiometer wiper 170, and comprises an electric timer motor 180 and a timer operated switch 182 connected to the motor 180 by a suitable linkage 183. The linkage 183 is preferably formed by a gear and cam arrangement which opens and closes the switch 182 at predetermined intervals during successive 24 hour periods. The motor, linkage and switch 182 may be of any suitable or conventional construction and are therefore not illustrated or described in detail.

During operation of the system 20 in the heating mode when the zones are normally occupied the switch 182 is maintained open so that the signal from the setback signal source circuit 160 is isolated from the discharge sensing circuits 106. The discharge sensing circuits 106 can, and frequently do, detect different temperature levels of discharge air flowing from the output dampers to the respective zones and the isolating diodes 174 prevent the common conductor 175 from shorting the respective signals together.

Subsequent to the normal period of occupancy of the building the timer unit functions to complete a circuit between the set back signal source circuit 160 and the respective sensing circuits 106 to establish a set back temperature level in the zones. The timer motor 180 operates the switch 182 to its closed position thus simultaneously connecting the discharge sensing circuits 106 of all of the zones to the set back signal level established at the wiper 170. The wiper 170 is set along the potentiometer 168 to establish a voltage level which is negative with respect to the voltage level at the junction 126 in each of the sensing circuits 106 thus causing the isolating diodes 174 to become conductive. In effect, the set back signal established at the wiper 170 is superimposed on the discharge air temperature signals created by the sensors 120 and the voltage level at each of the junctions 126 assumes the level of the signal established at the wiper 170.

The reduced signal level at the junction 126 causes the input signal to the amplifier unit 100 to be reduced to a relatively low level, via the authority controlling resistor 130, falsely indicating an apparent increase in the temperature of the zone air. The signal level established at the wiper 170 is sufficiently negative that it cannot be shifted as a result of air temperatures sensed by any of the elements 120 and accordingly, the element 120 of each of the circuits 106 is effectively prevented from controlling termination of cycling of any stages of the heating unit 16.

The zone air temperature sensing circuit 104 remains effective to sense zone air temperature changes and alter the input signal level to the amplifier unit 100 during the set back period. Hence when the air temperature in the coolest zone falls a predetermined amount below the desired set back level, the sensing circuit 104 of that zone is effective to produce an amplifier input signal at the junction 116 which is sufficient to initiate a cycle of the heating equipment. When the zone air temperature of the coolest zone reaches the set back level, the sensing circuit 104 for that zone produces an amplifier input signal for terminating operation of the heating equipment. The operation of the heating equipment solely by the zone air temperature sensing circuits 104 may result in moderate zone air temperature overshooting, but this is not undesirable during set back periods. It should be noted that the authority setting resistor 130 enables the associated zone air sensing circuit 104 to vary the voltage level at the junction 116 even though the voltage level at the junction 126 is maintained at the predetermined set back level.

If one or more of the zones is expected to be occupied during the set back period the appropriate manual switch (or switches) 172 is opened to prevent transmission of the set back signal to the signal producing circuitry associated with that zone, or zones. The remaining zones are connected to the set back unit 150 resulting in the temperature of those zones being set back to the desired set back level while the temperature of the occupied zone remains controlled at its desired set point level.

When a system is set back under these circumstances, the air temperature in the set back zones will coast to the set back level with the discharge damper unit associated with each of the set back zones positioned so that only recirculated air which has passed across the inactive cooling unit 18 is introduced to those zones. The zone which is not set back will initially appear to be the coolest zone and, when heating is required, is heated by air which has flowed solely across the heating units. Should the zone which is not set back require an increase in air temperature, the heating unit is operated from the sensing circuitry for that zone and only heat which is sufficient to return that zone to the desired set point level is transferred from the heating unit. Accordingly the amount of energy required to maintain the occupied zone at its set point temperature is minimized since substantially no heat is distributed to the set back zones.

When the air temperatures in the set back zones reach their set back level all of the zones are heated in accordance with normal operation of the system 20, described previously, except that the set back zones are maintained around the set back temperature level solely by the signals produced from the zone air sensing circuits 104 associated with those respective zones.

A system constructed in accordance with the present invention is also particularly useful in a building in which different zones are occupied during different periods of the day. FIG. 4 of the drawings illustrates a portion of a modified set back unit, indicated by the reference character 150', which is constructed to enable zones in such a building to be set back in accordance with predetermined individual schedules. Elements in FIG. 4 which correspond to elements illustrated and described previously are indicated by corresponding primed reference characters. As illustrated in FIG. 4, a connecting circuit 162' is provided with individual zone set back control switches 190–192 which are independently driven from a timer motor 180' for opening and closing at different selected intervals during the day. The switches 190–192 are preferably connected to the timer motor 180' by suitable linkages 183' such as individual cams which are driven by the motor and configured as desired to individually control the switches. The unit 150' is shown in FIG. 4 with the switches 190, 191 conditioned to provide for the maintenance of normal set point temperature levels in zones 2 and 3, while the switch 192 is conditioned so that the zone 1 air temperature is maintained around its set back level.

If desired, manually operated switches, like the switches 172 of FIG. 3, can be provided in the connecting circuit 162' so that temperature set back of one or more of the zones can be avoided when that zone is to be occupied during its normal set back period.

While alternate preferred constructions of the present invention have been illustrated and described here in considerable detail, the present invention is not to be considered limited to the precise constructions shown. Various adaptations, modifications and uses of the invention may occur to those skilled in the art which the invention pertains and the intention is to cover all such adaptations, modifications and uses which come within the scope or spirit of the appended claims.

What is claimed is:

1. In a system for governing air temperatures in zones of a multiple zone structure including circulating means for directing a forced flow of zone heating medium toward the zones, heating means for heating the medium flowing toward the zones, control means for governing operation of said heating means in response to an electrical input condition signal having a value which varies according to a reference value, said control means comprising a plurality of input signal producing circuit means each associated with a respective zone, a plurality of zone air temperature sensors each associated with a respective input signal producing circuit means and each producing an electrical zone air temperature signal which varies relative to a reference value in response to sensed changes in air temperature in the associated zone, a plurality of supply medium temperature sensors each associated with a respective input signal producing circuit means and each producing an electrical supply medium temperature signal which varies relative to a reference value in response to sensed changes in supply medium temperature flowing to the associated zone, said input signal producing circuit means individually responding to said zone air temperature signal and said supply medium temperature signal to produce an input condition signal, analyzer circuitry for selecting an input condition signal having an extreme value and transmitting said selected input condition signal to said control means, and, zone set back means including temperature set back signal source circuitry for producing a predetermined temperature set back signal and connecting means for connecting said set back signal source circuitry to each of said input signal producing circuit means so that said set back signal effectively replaces the supply medium temperature signal from the supply medium temperature sensors of each input signal producing circuit means connected to said set back signal source circuitry and the input condition signal value produced by any input signal producing circuit means connected to said set back signal source circuitry and selected by said analyzer circuitry is unaffected by the sensed temperature of heating medium supplied to that zone.

* * * * *